F. B. STOCKDALE AND H. A. SIMPSON.
POWER STORING MECHANISM.
APPLICATION FILED APR. 29, 1916.
1,311,190. Patented July 29, 1919.
3 SHEETS—SHEET 1.
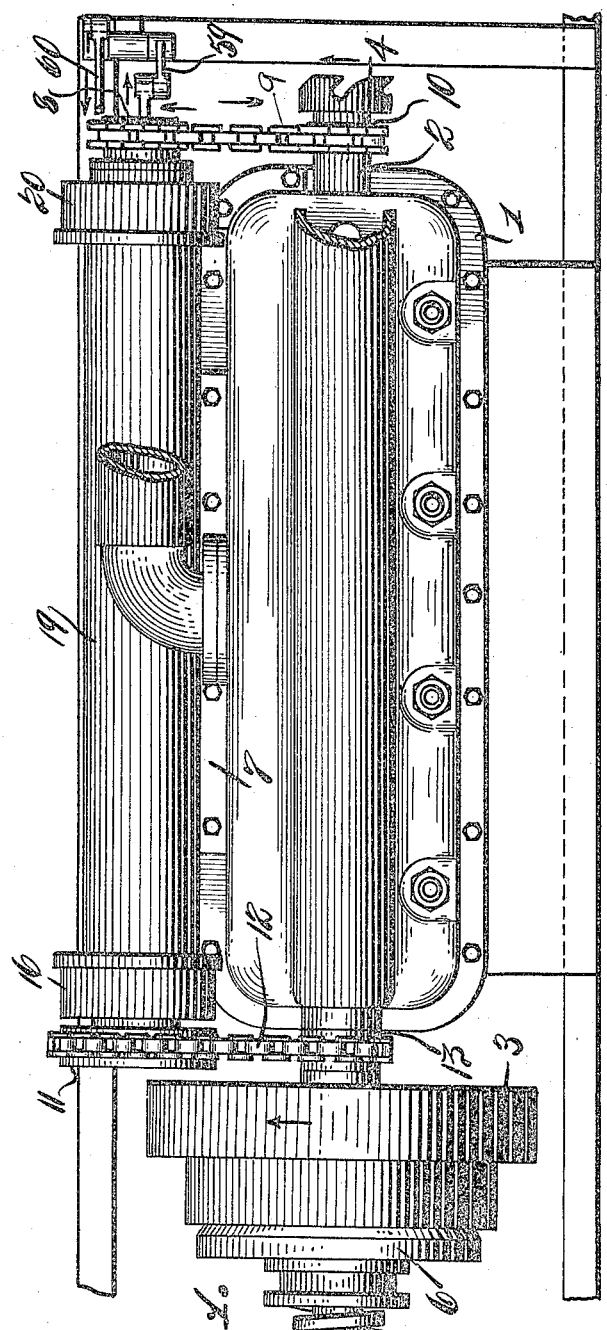

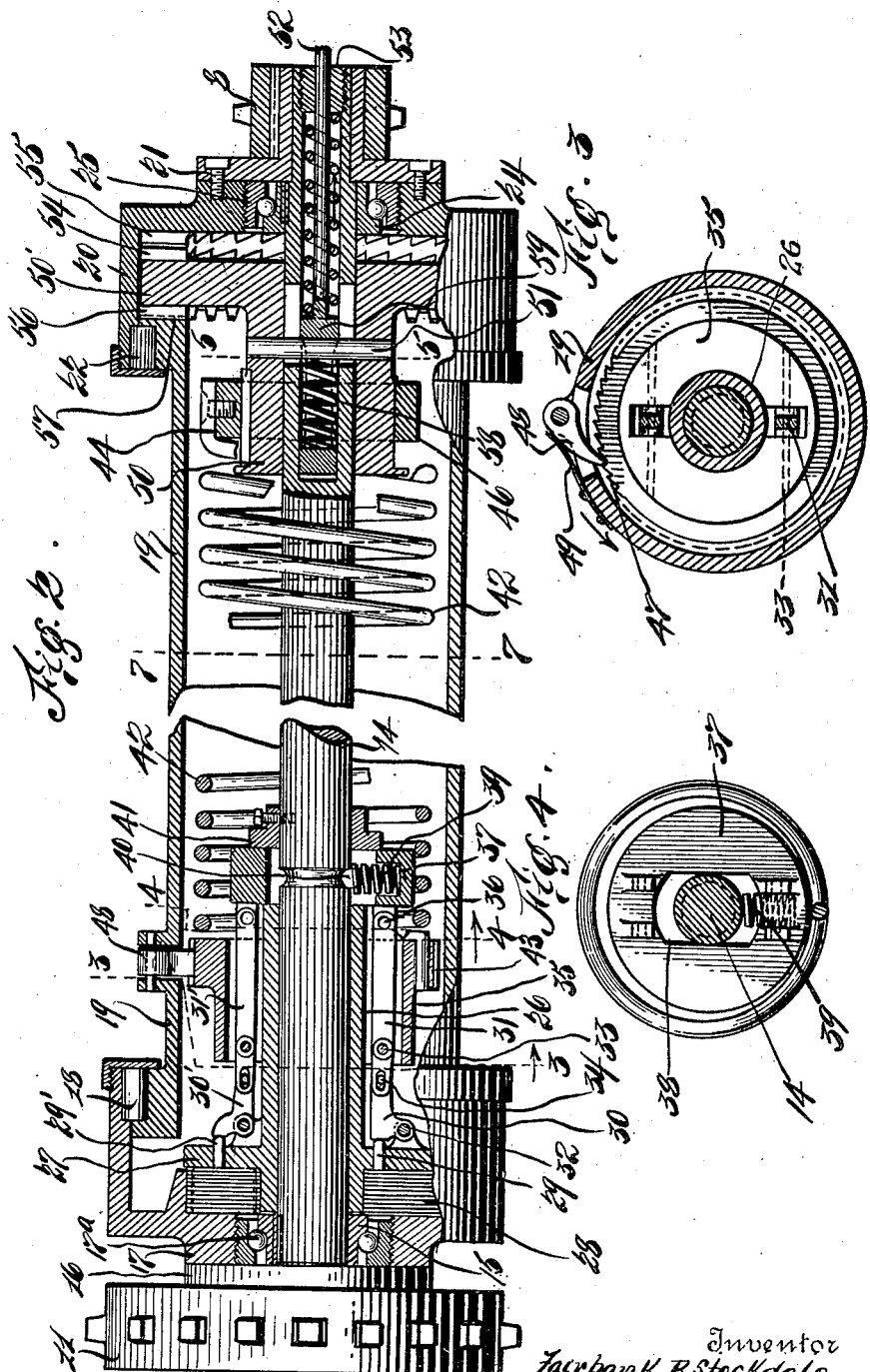

F. B. STOCKDALE AND H. A. SIMPSON.
POWER STORING MECHANISM.
APPLICATION FILED APR. 29, 1916.
1,311,190.
Patented July 29, 1919.
3 SHEETS—SHEET 3.
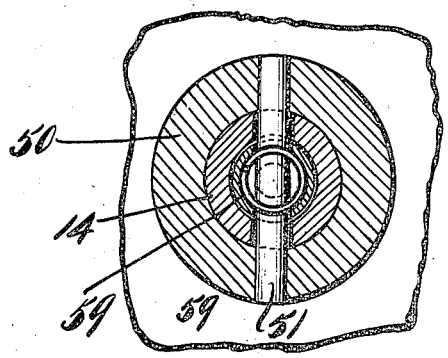
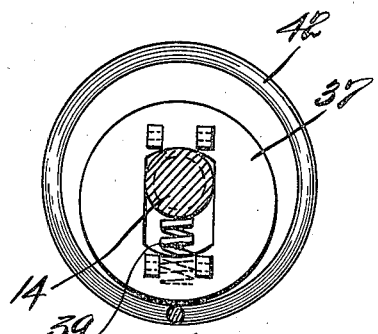
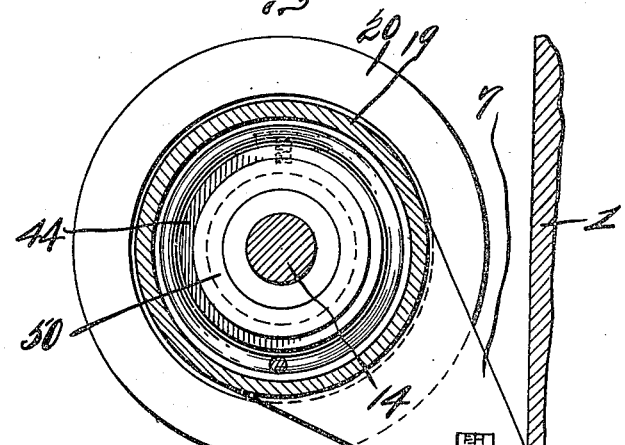

UNITED STATES PATENT OFFICE.

FAIRBANK B. STOCKDALE, OF BROOKLYN, NEW YORK, AND HOBART A. SIMPSON, OF OCEAN GROVE, NEW JERSEY.

POWER-STORING MECHANISM.

1,311,190.     Specification of Letters Patent.     Patented July 29, 1919.

Application filed April 29, 1916. Serial No. 94,446.

*To all whom it may concern:*

Be it known that we, FAIRBANK B. STOCKDALE and HOBART A. SIMPSON, citizens of the United States, residing at Brooklyn, New York, and Ocean Grove, New Jersey, respectively, have invented certain new and useful Improvements in Power - Storing Mechanisms, of which the following is a clear, full, and exact description.

This invention relates to a power storing mechanism and is particularly adapted for use as a self-starter for hydro-carbon engines in automobiles, motor boats, and the like. The object of the invention is to to improve and simplify the construction of such mechanisms so as to make the same reliable and economical in operation.

Although in the present embodiment we have shown the invention employed as a self-starter for a gas engine, nevertheless we wish it to be understood that the utility of the mechanism is of much wider scope. It may, for instance, be suitably applied for absorbing and storing the surplus power produced by ordinary horse drawn vehicles in going down hill or in coming to a stop, which power may be returned to the wheels when desired for starting up the vehicle from a stand-still to partially offset the dead weight of the load.

With this and other objects in view, the invention consists of novel features of construction and combinations and arrangements of parts, all of which will be more fully described hereinafter and particularly pointed out in the appended claims.

In the drawings which show the preferred embodiment of the invention,

Figure 1 is a plan view of our power storing mechanism employed as a self-starter for a hydro-carbon engine;

Fig. 2 is a longitudinal section of the power storing mechanism;

Fig. 3 is a cross section of the same along line 3—3 of Fig. 2, looking in the direction of the arrow;

Fig. 4 is a cross section of the same along line 4—4 of Fig. 2, looking in the direction of the arrow and showing the power storing spring in wound up or contracted condition;

Fig. 5 is a cross section along line 5—5 of Fig. 2;

Fig. 6 is a section similar to Fig. 4 but with the power storing spring in unwound or expanded condition; and Fig. 7 is a cross section along line 7—7 of Fig. 2.

Referring more particularly to the drawings, 1 indicates an ordinary hydro-carbon engine, the details of which are unessential to this invention. 2 indicates the driving shaft of said engine hereinafter referred to as a rotatable member. It is understood, of course that this engine shaft 2 is extended longitudinally through the engine and is provided with a fly-wheel 3 at the rearward end and a hand crank engaging clutch member 4 at the forward end. This clutch member 4 is adapted to be operated by the ordinary hand-crank for starting the engine by hand or for winding up our power storing spring by hand, as will become clear from the following description. 6 indicates a suitable cone clutch for driving a propeller shaft 5 from the engine shaft 2.

The power storing mechanism is partially inclosed within a stationary casing 19, shown as mounted at one side of said engine on brackets 7, fixed to some permanent part of the frame, see Fig. 7. The forward end of the power storing mechanism is provided with a gear 8 connected by a chain 9 with a gear 10 on the engine shaft 2, and the rear end of the power storing mechanism is likewise provided with a gear 11 connected by a chain 12 with a gear 13 upon the engine shaft 2. These gears 8 and 11 thus run at all times with the engine and their connections with the power storing mechanism within the casing 19 will be made clear with a more detailed description of said power storing mechanism.

Referring more particularly to Fig. 2, the power storing mechanism is shown to consist preferably of a central shaft 14 having keyed thereto at one end a cone bearing 15 about which is adapted to turn an exterior hub 16 through cone bearing 17 and balls 17ª. It is understood that the gear-wheel 11 is fixed to hub 16 so that the same is normally rotated when the engine is running. The hub 16 is also provided with roller bearings 18 between said hub and the stationary casing 19. Upon the other end of said stationary casing 19 is also mounted an exterior hub 20 fixed to the gear 8, as shown by bolts 21, so as to constantly rotate therewith when the engine is running. Roller bearings 22 are provided between hub 20 and the stationary casing 19. Inner cone and ball bearings 24 and 25 are also provided between said hub 20 and the central shaft 14. The cone 24 is fixed to the shaft 14 and cone 25 is fixed to the hub 20. It will thus be perceived that if one of the rotating hubs of said power mechanism is connected to wind up a spring when the engine is running, the other hub of said power storing mechanism may be employed through suitable connections, to deliver the torque of said spring, to turn over said engine shaft in the same direction for starting the engine.

In the preferred embodiment of our invention, the construction for performing these functions is as follows: Referring again to Fig. 2, 26 is an interior hub loosely mounted upon the central shaft 14 so as to permit of rotation thereon. The hub 26 is provided with a flange 27 at its rear end between which and the wall of hub 16 are mounted suitable disk clutch plates 28 forming the ordinary disk clutch between said flange 27 and hub 16. Suitable sliding pins 29 and 29' are employed for forcing said plates into clutching contact. The sliding pins 29 and 29' are forced inwardly against the clutch plates by one or more toggle lever arrangements 30 and 31, 30' and 31'. A description of one of these toggle arrangements will be sufficient. The levers 30 are pivoted at 32 on the flange 27, and levers 31 are pivoted at 33 within the walls of a slotted enlargement 35, which enlargement is integral with the interior hub 26, as shown in Fig. 3. Levers 30 and 31 are connected at their ends by a pin and slot engagement 34. The forward end of lever 31 is pivotally connected at 36 to a collar 37, which collar has a slotted bearing 38 upon the shaft 14 to permit its movement from an eccentric position to a concentric position with respect to said shaft 14, see Fig. 4. A spring 39 between said shaft 14 and the collar 37 normally tends to throw said collar 37 to its eccentric position. This spring 39 may have a suitable non-frictional engagement with the shaft 14 by a ball 40 running in a groove in said shaft. 41 is a fixed collar secured to the shaft 14 to serve as an end abutment for the movable collar 37 and prevent its endwise movement. A power storing spring 42 coiled around the central shaft 14 is anchored at one end at 43 in the enlargement 35 of hub 26 and at the other end at 44 on a slidable collar 46 keyed against rotation to an interior hub 50. The hub enlargement 35 is also provided with a toothed periphery 47 engaged by a holding pawl 48 mounted upon the stationary casing 19. Spring 49 normally tends to hold the holding pawl 48 in engagement with the toothed periphery 47.

It will be observed by referring to Figs. 2 and 6 that when power storing spring 42 is in its expanded condition, the spring 39 will tend to throw the movable collar 37 to its eccentric position as shown clearly in Fig. 6. In this position of the movable collar 37, the toggle levers 30, 31, are arranged to force the slidable pins 29 inwardly against the clutch plates 28 and thus engage said clutch. If this takes place when the engine is running, the rotation of hub 16 will consequently rotate hub 26 through the clutching engagement of disk clutch 28, and thus wind up the coil spring 42. The other end of the coil spring 44 is anchored against movement to the stationary casing 19 as will be hereinafter described. As the coil spring 42 is thus wound up, it becomes contracted to the position shown approximately in Fig. 4. This contraction of spring 42 throws the movable collar 37 from its eccentric position in Fig. 6 toward its concentric position shown in Fig. 4, and this movement of the collar 37 through the toggle levers 30 and 31 disengages the clutch plates 28, thus preventing overwinding of the spring 42. The spring 42 is held in its wound up condition by holding pawls 48 engaging peripheral teeth 47 on the hub enlargement 35.

The forward end of the shaft 14 has mounted upon it the slidable hub 50 which has a keyed engagement with said shaft through a cross pin 51. The forward end of the shaft 14 is also hollowed as shown, and extending through this hollowed portion is a slidable rod 52 connected to the cross pin 51 through a slotted block 59 and spring 58, so that the connection will be yielding. Thus, by sliding the rod 52 back and forth, the hub 50 may also be moved back and forth upon the end of the shaft 14. A plug 53 is used to close up the open end of the shaft 14 and also furnish a bearing for the rod 52. The interior hub 50 is flanged at 50', and on the forward side of said flange near the periphery thereof are inclined teeth 54 adapted to engage teeth 55 formed in the opposing face of exterior hub 20, and when thus engaged, to drive said exterior hub 20 with said flanged hub 50 in one direction only. The rear side of flange 50' is likewise provided with locking teeth 56 adapted to engage with similar locking teeth 57 in the stationary casing 19, and when thus engaged, prevent the movement of hub 50 in either direction. A coil spring 60 mounted within the hollow end of shaft 14 tends to throw rod 52 and hub 50 toward the left so as to normally engage said hub 50 through its flange 50' with the locking teeth 57 of the stationary casing 19. Thus, in normal condition the forward end of the power storing spring 42 is always anchored against movement. Furthermore, the toothed engagement at each side of flange 50' thus described, is so designed that the forward side of said flange 50' when moved toward teeth 55 will become engaged therewith for driving hub 20 before the rear side of said flange 50' is disengaged from the locking teeth 57, thus preventing the release of said power storing spring 42 except for driving member 20.

The release of power storing spring 42 and the starting of the engine is effected as follows: Assuming the spring 42 to have been wound up by the previous running of the engine or by any suitable means, such as a hand-crank through clutch 4, then when the engine is stopped and it is desired to start it again, the rod 52 is pulled in the direction of the arrow of Fig. 2 and hub 50 is disengaged from the stationary casing 19 and engaged with the movable hub 20. The torque of the wound up spring 42 is thus delivered through hub 20 and gear connections 8, 9 and 10 to the shaft 2 of the engine tending to rotate the same for starting the engine. As soon as the engine is started, the continued rotation of hub 20 may cause it to run ahead of the hub 50 without damage thereto on account of the inclined tooth engagement and spring 58. The rod 52 may be operated by any suitable arrangement of bell cranks and pedal, such as indicated at 59, 60, in Fig. 1, so as to be convenient for handling by the operator.

The power storing mechanism heretofore described is of course applicable to other uses than the one shown. If, for instance, it is to be applied to the ordinary horse drawn vehicle for giving a braking action against the wheels as the vehicle is brought to a stop, the connections would be so arranged that normally the power storing spring would not be wound up except when it was desired to apply the mechanism as a brake for the vehicle. Then when it was desired to help start the vehicle again, the power storing spring might by suitable connections be utilized to help turn the wheels, and thus relieve the horses of the dead weight of the vehicle and its load.

We are aware that various modifications, changes in detail, and readjustment of parts may be made in this invention as heretofore described without departing from the spirit and scope of the invention as hereinafter defined.

What we claim as new is:—

1. In a power-storing mechanism, in combination, a rotatable member, a power storing spring, winding means for said spring, a friction clutch between said rotatable member and said winding means, means for automatically controlling said friction clutch, comprising a spring controlled member arranged within said power spring to be moved by the contraction of said power spring to release said clutch, the spring of said member when so moved being put under tension to gradually throw in said clutch when released by the expansion of said power storing spring.

2. In a power storing mechanism, in combination, a rotatable member, a power storing spring, winding means for said spring, a clutch between said rotatable member and said winding means, and means for automatically controlling said clutch, comprising a member resiliently mounted within said spring and moved by the contraction of said power storing spring to release said clutch, said member releasable by the expansion of said spring to gradually throw in said clutch.

3. In a power storing mechanism, a shaft, a power storing spring surrounding said shaft, a rotatable member for winding said spring, a clutch between said spring and said rotatable member, means for controlling said clutch comprising a member mounted on said shaft and sliding transversely thereon as said spring expands or contracts, and connections between said member and said clutch whereby the clutch is operated to connect the spring and rotatable member when the spring is unwound, and to disconnect the spring and rotatable member when the spring is fully wound.

Signed at New York city, N. Y., this 28" day of April, 1916.

FAIRBANK B. STOCKDALE.
HOBART A. SIMPSON.

Witnesses:
C. CLARK,
BEATRICE MIRVIS.

Copies of this patent may be obtained for five cents each, by addressing the "Commissioner of Patents, Washington, D. C."